Figure 1:
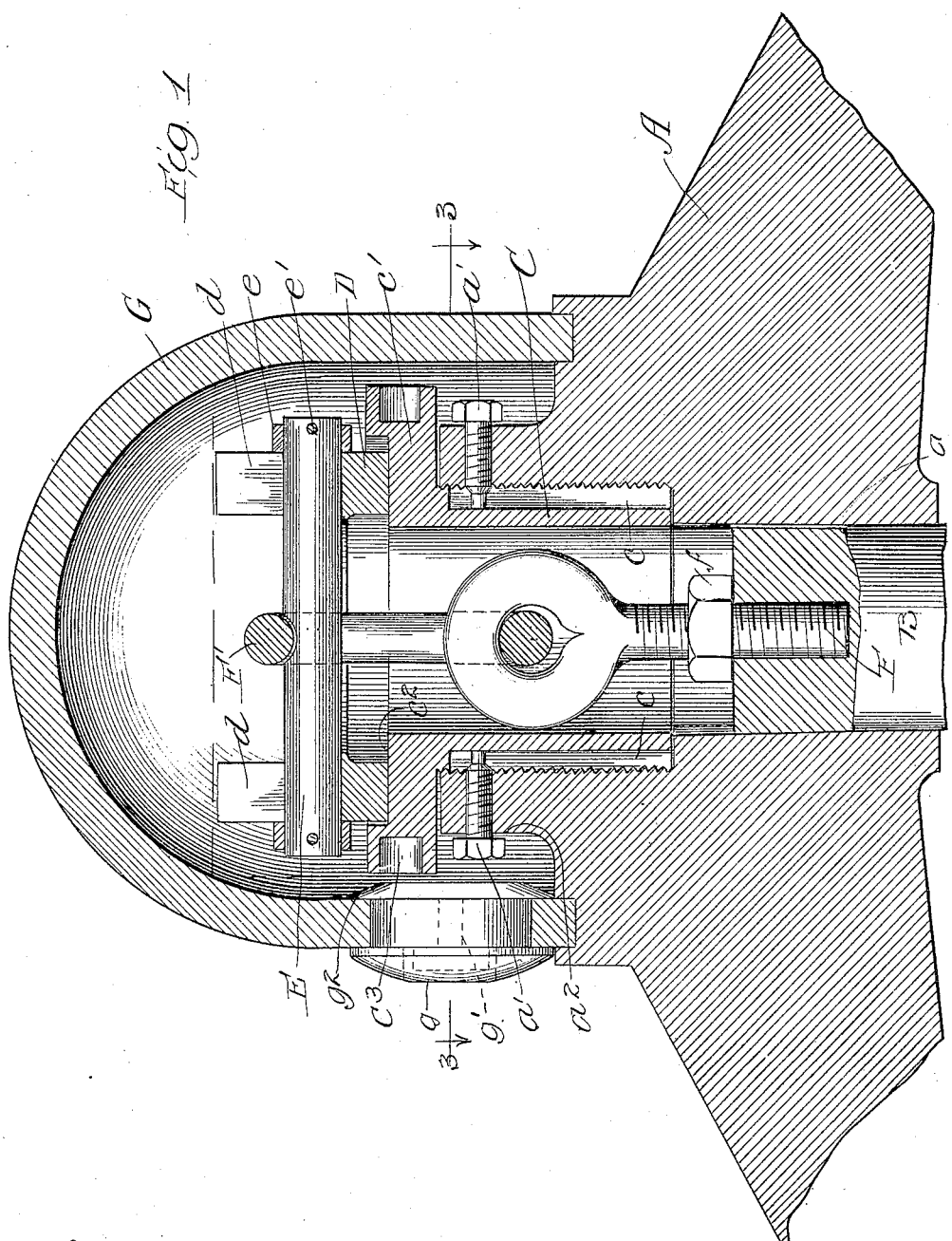

N. DE WIND & J. HUGHSTON.
CRUSHER.
APPLICATION FILED OCT. 24, 1907.

909,374.

Patented Jan. 12, 1909.
3 SHEETS—SHEET 1.

Witnesses:
Ray White
Harry R L White

Inventors
Norman DeWind,
John Hughston,
By W. W. Withenbury, Atty.

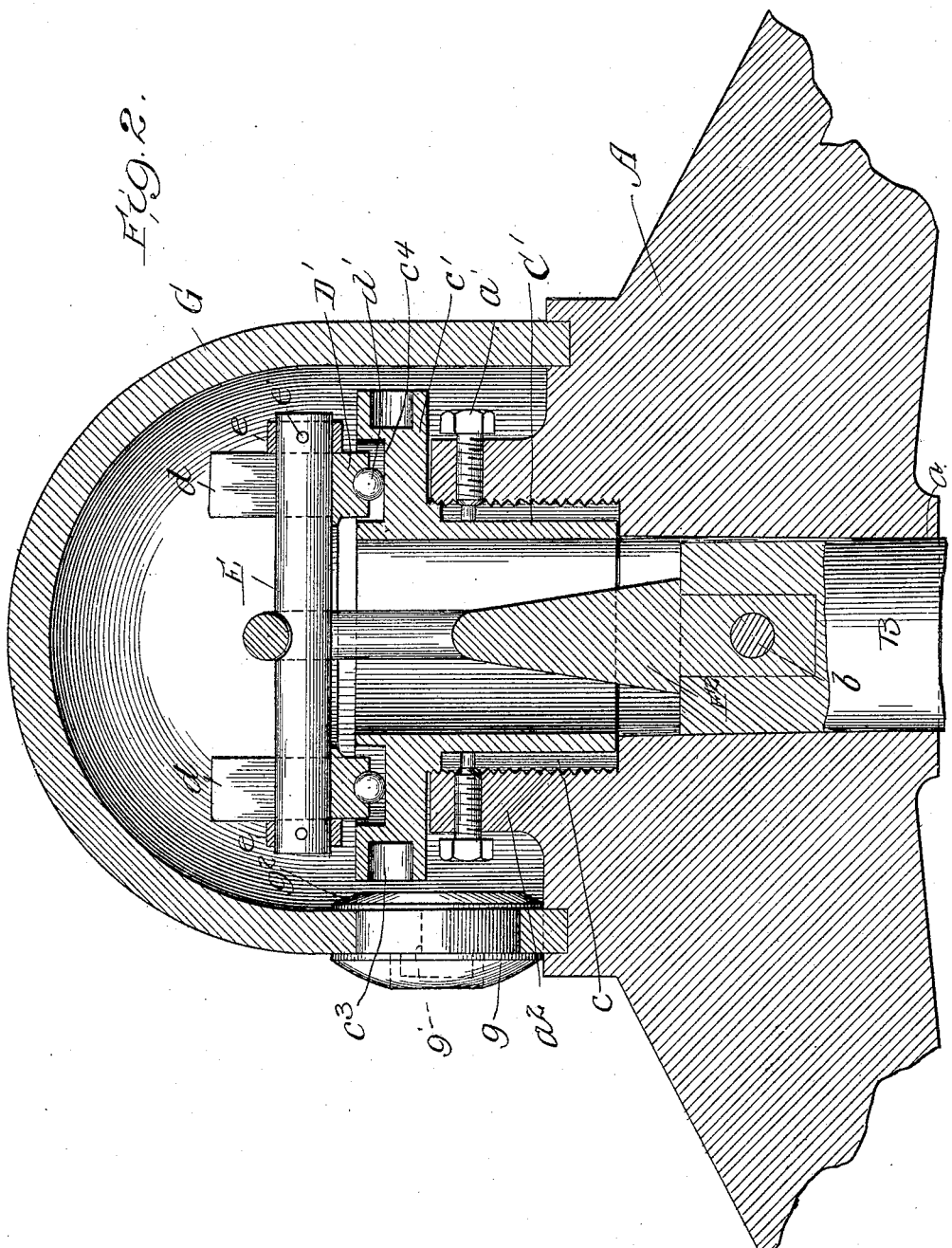

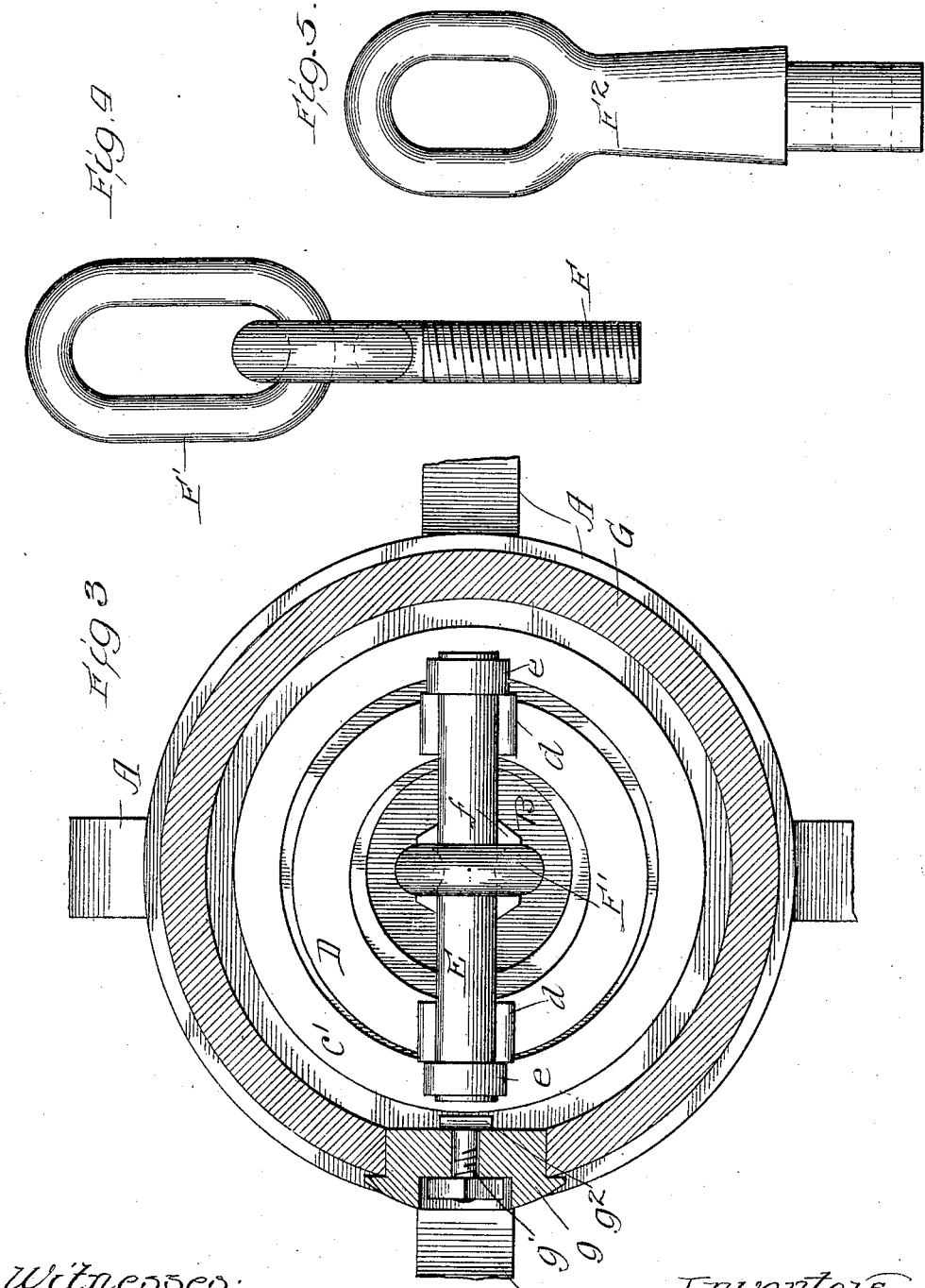

UNITED STATES PATENT OFFICE.

NORMAN DE WIND AND JOHN HUGHSTON, OF HARVEY, ILLINOIS.

CRUSHER.

No. 909,374.  Specification of Letters Patent.  Patented Jan. 12, 1909.

Application filed October 24, 1907. Serial No. 398,936.

*To all whom it may concern:*

Be it known that we, NORMAN DE WIND, a subject of the King of Great Britain, and JOHN HUGHSTON, a citizen of the United States, and both residing at Harvey, in the county of Cook and State of Illinois, have invented a new and useful Improvement in Crushers, of which the following is a complete specification.

This invention relates to improvements in crushers and more particularly to the means for suspending the main shaft of a gyratory crusher.

In gyratory stone and ore crushers and the like, where the crusher head and gyratory shaft therefor are of great weight it is desirable to suspend them, or support their weight from above, instead of providing a bearing at the base of the shaft as is ofttimes done. When the shaft is supported on a bearing at its base the great weight not only causes excessive wear on the bearings but also requires a great deal more power to operate the eccentric, which imparts the gyratory motion to the shaft, than where the base of the shaft is free to move under the influence of the eccentric.

The object of this invention is to provide means for suspending the main shaft of a gyratory crusher from a central point and upon a bearing which is both free to rotate and to move in a path eccentric to the shaft, so as to be able to respond freely to the gyrations of the latter.

It is also an object of the invention to provide a flexible or yielding connection between the shaft and its bearings adapted to absorb a portion of the gyratory movement of the shaft and thereby decrease the wear on the bearings.

It is a further object of the invention to provide a bearing which is quickly detachable from the shaft to permit the same or the shaft to be removed from the crusher if desired.

The invention consists of the matters hereinafter described in the specification and more fully pointed out and defined in the appended claims.

In the drawings: Figure 1 is a fragmentary, vertical section of the upper portion of a stone crusher and showing the means for suspending the shaft. Fig. 2 is a similar view but showing slight modifications. Fig. 3 is a section taken on line 3—3 of Fig. 1 and showing the bearing member or ring in plan view. Fig. 4 is an enlarged view of the connection between the bearing ring and the shaft, shown in Fig. 1. Fig. 5 is an enlarged view of the connection between the bearing ring and the shaft, shown in Fig. 2.

As shown in said drawings: A indicates the spider at the top of the crusher and which is provided with the usual tapering bearing $a$ for the upper end of the gyratory shaft B and at the lower end of which is the center of gyration for the shaft. Above said bearing $a$ the spider is provided with a threaded recess concentric with the bearing $a$ and in which the adjusting bushing C has threaded engagement. Said bushing as shown is provided with a plurality of slots or grooves $c$ extending transversely of the threads, and set screws $a'$ are carried in a flange $a^2$ on the top of the spider, and when the bushing has been properly adjusted are adapted to engage in said grooves, and hold the bushing in adjusted position. On the upper end of said bushing and projecting outwardly over the flange $a^2$, is a peripheral flange $c'$ having an annular bearing seat or race $c^2$ therein, concentric with the bore of the bushing.

In the construction shown in Fig. 1, an annular bearing ring D, of less diameter than the diameter of the bearing seat, is seated in said bearing seat $c^2$ and comprises a ring of any suitable metal adapted to rotate and to move laterally or eccentrically on said bearing seat. A support bar or shaft E extends diametrically across the ring D and is engaged at its ends between lugs $d$ on said ring. Said bar may be held from longitudinal movement in any preferred manner, but as shown is provided at each end with a collar $e$ which is secured thereon by means of a pin $e'$ and bears on the outer side of said lugs. An eyebolt F has threaded engagement in the top of said shaft and is held in position by a set nut $f$ bearing on the top of the shaft. Said bolt extends upwardly into the bushing C and is connected with said bar E by means of a link F', which engages over the bar and is seated in a notch or recess in the top of said bar, and situated at a central point intermediate the ends thereof. For the purpose of protecting the bearings from dust and dirt, a dust cap or hood G is supported in a suitable groove or recess in the top of the spider, and is provided in its side with a doorway through which a suitable bar or spanner may be inserted to engage in notches $c^3$ in the flange $c'$ of the bushing, for the purpose of adjusting the latter. Said doorway may be closed in any preferred manner, but as shown a plug $g$ is adapted to be inserted therein, and a bolt $g'$ provided with an elongated head $g^2$ adapted to engage on the inner side of the hood, extends through the plug and is provided with a nut on its outer end to hold it in place.

In the construction shown in Fig. 2 the bearing ring D' is provided with ball bearings $d'$ which engage on the seat $c^4$ of the bushing C', and the eyebolt $F^2$ is connected directly with the support bar E, thereby dispensing with the link. Said eyebolt is fitted tightly in an aperture or bore in the top of the shaft B and a pin $b$ extends therethrough and through the top of the shaft.

The operation is as follows: When the bushing is rotated it is moved up or down according to the direction of rotation, thereby adjusting the shaft vertically to regulate the degree of fineness of the crushed material. Inasmuch as the race or bearing seat for the truck is of greater diameter than the truck, it is obvious that the truck is free to rotate, swing or gyrate in an eccentric manner in accordance with the motion imparted to it by the gyratory shaft, while the flexible connection between the shaft and the truck tends to absorb some of the movement of the shaft, thereby lessening the work on the bearings. Furthermore with the link connection between the shaft and support bar, as shown in Fig. 1, the shaft may rise during its operation without danger of shifting the point of suspension on the support bar.

We claim as our invention:

1. In a device of the class described the combination with a gyratory shaft of a bearing ring therefor, means connecting said shaft and said ring and affording a flexible joint adjacent the center of the ring from which the shaft is suspended, and a race in which said ring is adapted to move with an eccentric motion.

2. In a device of the class described the combination with an adjustable bushing of an annular bearing seat thereon, a bearing member in said seat adapted for both rotary and lateral motion, a gyratory shaft and means adapted to suspend said shaft from the central point on said member.

3. In a device of the class described the combination with means affording an annular bearing seat, of a ring adapted to travel eccentrically thereon, a transverse support bar on said ring, a gyratory shaft and means for suspending said shaft on the support bar.

4. In a device of the class described the combination with a spider of an adjustable bushing thereon, an annular bearing seat on said bushing, a ring on said seat adapted to move in an eccentric path, a support bar carried on said ring, a shaft journaled in said spider and a flexible connection between said shaft and said bar.

5. In a device of the class described the combination with a spider having a central bearing therein, an adjustable bushing on said spider concentric with the bearing, an annular bearing seat on said bushing, a ring on said seat free to move in a path eccentric to the axis of the bushing, a removable support bar thereon, a shaft journaled in the bearing of said spider and means connected with said bar by a laterally yielding joint for suspending the shaft therefrom.

6. In a device of the class described the combination with a spider having a central, tapered bearing therein, of a bushing adjustably engaged on said spider and in axial alinement with said bearing, an annular bearing seat thereon, a ring on said bearing seat and of less diameter than the same, a horizontal support bar on said ring, a gyratory shaft journaled in the bearing in said spider, and a link connecting said bar and said shaft.

7. In a device of the class described the combination with a spider having a central, tapered bearing therein, of a vertically adjustable bushing above said bearing, a flat, annular bearing seat on said bushing, a ring of less diameter than said seat and adapted to move thereon in an eccentric manner, lugs on said ring, a support bar removably engaged between said lugs, a gyratory shaft journaled in the bearing in said spider, and means swung from said support bar and suspending the shaft therefrom.

8. In a device of the class described the combination with a spider having a central, tapered bearing therein, of a vertically adjustable bushing on said spider above the bearing, a peripheral flange on said bushing having an annular bearing seat therein, a ring on said seat adapted for both lateral and rotary motion, anti-friction bearings for said ring, a transverse support bar on said ring, a gyratory shaft journaled in the bearing in said spider, and means flexibly connecting said shaft with said bar.

In testimony whereof we have hereunto affixed our signatures in the presence of two witnesses.

NORMAN DE WIND.
JOHN HUGHSTON.

Witnesses:
  F. N. HYDE,
  C. H. APPLEGATE.